FIG. I.

INVENTORS.
Joe F. Moore,
Thomas H. Royder,

INVENTORS.
Joe F. Moore,
Thomas H. Royder,

Nov. 24, 1959

J. F. MOORE ET AL 2,914,456

DEWAXING OF OILS BY LINE FILTRATION
FOLLOWED BY ROTARY FILTRATION

Filed Feb. 28, 1957

INVENTORS.
Joe F. Moore,
Thomas H. Royder,
BY
ATTORNEY.

United States Patent Office 2,914,456
Patented Nov. 24, 1959

2,914,456

DEWAXING OF OILS BY LINE FILTRATION FOLLOWED BY ROTARY FILTRATION

Joe F. Moore and Thomas H. Royder, Baytown, Tex., assignors, by mesne assignments, to Esso Research and Engineering Company, Elizabeth, N.J., a corporation of Delaware Application February 28, 1957, Serial No. 643,096

4 Claims. (Cl. 208—38)

The present invention is directed to a method for dewaxing oils. More particularly, the invention is directed to a method for dewaxing oils in a solution of precipitating-diluent solvent. In its more specific aspects, the invention is concerned with the dewaxing of lubricating oils at a low temperature under critical conditions of flow.

The present invention may be briefly described as a method of dewaxing lubricating oil fractions employing a precipitating-diluent type of slurry, the temperature being adjusted for the particular operation. In the present invention, as applied to dewaxing operations, a solution of lubricating oil in the solvent is chilled to a temperature sufficiently low to form a slurry of wax crystals in the solvent. The chilled slurry is then flowed through an annular space across a filtering surface in a filtration zone at a sufficient velocity to maintain a pressure drop across the filter surface within the range of about 0.1 to about 1 pound per square inch per minute. The filtration zone under these conditions causes the concentration of wax crystals in the slurry and allows the obtaining of a dewaxed oil in solution in the solvent. The concentrated slurry is then flowed to a second filtration stage which is usually a rotary filtration zone wherein a second filtrate is obtained and a wax and solvent phase. The second filtrate is returned to the first filtration zone in admixture with additional solvent, if necessary, to recover additional amounts of dewaxed oils therefrom.

The particular feature of the present invention is the employment of a so-called line filter in the first filtration zone. This line filter may be suitably designated as an isothermal filtration zone in which a filtrate is separated from a concentrated slurry. In the line filter, the solids concentration of the wax crystals in the solution is appreciated such that the slurry may have a concentration of about 20 to about 60 weight percent of wax crystals being increased from about 5 to about 10 weight percent originally. Thereafter, the wax crystals are removed from the concentrated slurry in a rotary filtration zone.

The present invention is quite advantageous and useful in that when operating with a line filter in a first filtration zone at constant filtrate rate operation for a given filter cycle length, a square foot of line filter area is about 1.5 times as effective as the same area of a rotary filter. Furthermore, for a given lubricating oil, operation of the line filter improves rapidly as slurry flow across the filtering surface increases until a critical annulus velocity is reached in the range from about 5 to about 15 feet per second. Velocities above this range are not feasible. For example, where a pressure drop of 30 pounds is available, cycle lengths may vary from about ½ to about 5 hours. Increasing the available pressure drop results in increasing cycle length.

The precipitating-diluent type solvent employed in the present invention is used in both stages thereof with one component being a precipitating type component and the other being a diluent type component. Specific examples of solvents and solvent mixtures which may be used in the practice of the present invention are as follows: The precipitating type component may be a ketone and the diluent type component may be an aromatic material. Specific ketones are acetone, methyl ethyl ketone, methyl normal propyl ketone and di-ethyl ketone or mixtures thereof while the aromatic materials serving as the diluent type component may be benzene or toluene or mixtures thereof. As another group of solvent mixtures the precipitating type component may be ethylene dichloride used in conjunction with a diluent type component which may be benzene or chloroform or carbon tetrachloride or mixtures thereof. As another example, the precipitating type component may be furfural and used in conjunction with benzene as the diluent type component.

It is to be understood in the specific examples listed that the precipitating type component and the diluent type component are not necessarily pure. As a specific example, the precipitating type component may consist of a major amount of methyl ethyl ketone and a minor amount of benzene while the diluent type component may consist of a minor amount of methyl ethyl ketone and a major amount of benzene. Similarly, when using other pairs of components, mixtures may be employed for each component. It will be apparent to a workman skilled in the art that many other well-known dewaxing solvents and solvent mixtures have their requisite characteristics for use as precipitating type components and diluent type components. A workman skilled in the art may readily select a suitable precipitating type solvent or solvent mixture for use with a suitable diluent type solvent or solvent mixtures in the practice of the present invention. As specific examples of solvent mixtures suitable in the practice of the present invention may be mentioned solvent mixtures consisting of 58% by volume of methyl ethyl ketone, 39% by volume of toluene and 3% by volume of benzene. Other solvent mixtures of methyl ethyl ketone and aromatics may be employed with the methyl ethyl ketone ranging from about 60% to about 80% by volume of the mixture and the aromatic hydrocarbon ranging from about 39% to about 19% of the mixture with about 1% by volume of water.

Temperatures employed in the first stage of the present invention may range from about −10° to about 120° F. with satisfactory results being obtained in the range from about −10° to about 0° F. The second stage separation may suitably be operated at a temperature in the range from −10° to 120° F. with satisfactory results being obtained at a temperature in the range of −10° to 100° F.

In the line filtration zone the filtering surface is suitably a cloth, such as one composed of nylon or cotton, but other type filtration surfaces may be employed. The filtering surface in the rotary filtration zone may be composed of a filter cloth made of nylon or cotton or other filtering materials as may be desirable. It is desirable to use a filtering cloth on the line and rotary filter which will give satisfactory pour points of the filtered oil. The yarn from which the cloth is obtained must contain a minimum number of short fibres as filler materials. Openings in the filter cloth should be at least about 1 micron, but no greater than about 5 microns for satisfactory results.

The present invention will be further illustrated by reference to the drawing in which.

Figure 1:
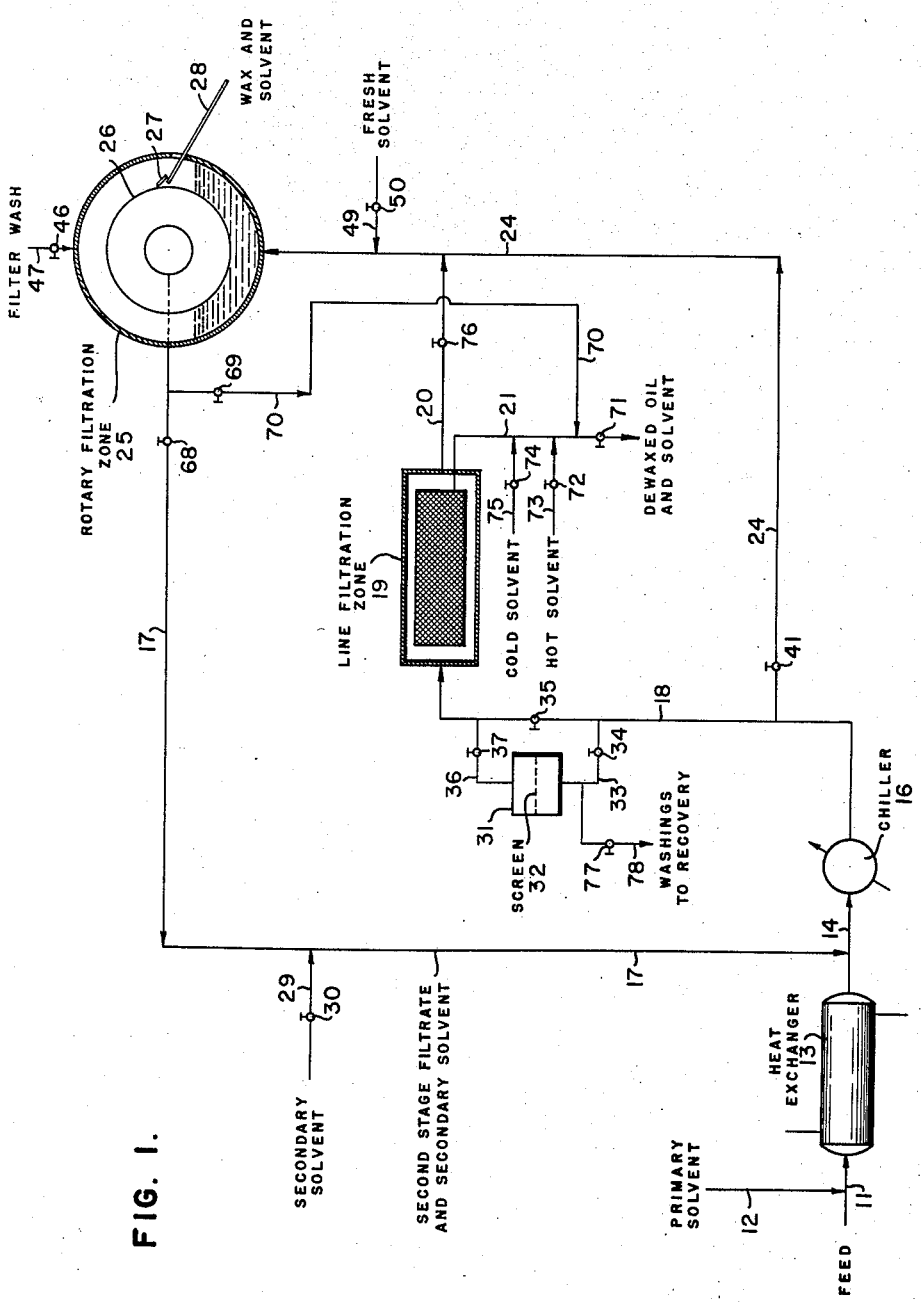
Fig. 1 is in the form of a flow diagram of a preferred mode.

Referring now to the drawing in which identical numerals will be employed to designate identical parts and particularly to Fig. 1, numeral 11 designates a charge line by way of which a lubricating oil distillate or fraction is introduced into the system from a source not shown. In line 11 the lubricating oil distillate is admixed with primary solvent which, in this instance, may be methyl ethyl ketone and toluene introduced by line 12. The mixture of primary solvent and lubricating oil distillate flow into a heat exchanger, such as 13 wherein it is chilled from a temperature of about 140° F. to about 40° F. by passing in heat exchange, for example, with the dewaxed oil and solvent. The chilled oil then flows by way of line 14 into a chiller 16 where the temperature is reduced still further to about 0° F. A second-stage filtrate and secondary solvent are added to the partially chilled feed mixture and primary solvent by line 17; the combined mixture, as has been described, is introduced into chiller 16 and thence by way of line 18 into a line filtration zone generally indicated by numeral 19. In line filtration zone 19 the slurry of wax crystals is concentrated to provide a concentrated slurry containing about 50% by weight of wax crystals. This concentrated slurry is discharged from the filtration zone 19 by line 20 for further treatment as will be described. The dewaxed oil and solvent is removed from filtration zone 19 by way of line 21, the dewaxed oil flowing through the filter surface 22 into the annular space 23, as shown more clearly in Figs. 4 to 6. The dewaxed oil and solvent may be subjected to a stripping operation to recover the solvent and to free the dewaxed oil of the solvent. The dewaxed oil may then be used as a lubricating oil fraction.

The concentrated slurry discharges from line 20 into line 24 and is introduced thereby into a rotary filtration zone 25. In rotary filtration zone 25 the secondary filtrate is withdrawn by line 17 and returned to the chilling zone 16. Wax and solvent are removed from the filtering surface 26 by a suitable knife blade 27 and discharged by way of a conveyer 28 for removal of solvent from the phase.

Secondary solvent may be added to the second stage filtrate by way of line 29 controlled by valve 30. This secondary solvent may comprise methyl ethyl ketone and toluene.

If the methyl ethyl ketone aromatic solvent contains an excess amount of water over about 1% by volume, it may be desirable to flow a portion or all of the chilled solution or slurry through a screening zone 31 containing a screen 32 to remove ice crystals from the slurry. To this end line 33 controlled by valve 34 allows a portion or all of the chilled slurry to be routed to zone 31 by closing or throttling valve 35 in line 18. The chilled slurry, after removal of ice, is returned to line 18 by line 36 controlled by valve 37. Ice may be removed from zone 31 in a manner which will be described hereinafter.

The filtration zone 10 is operated at a sufficient velocity of flow in the annular space 40 as indicated and to maintain a pressure drop across the filter surface 22 in the range from about 0.1 to about 1 pound per square inch per minute. Under these conditions at a constant filtrate rate substantially improved results are obtained over that obtainable by rotary filtration means. When the pressure drop across the filtering surface 22 exceeds the range given, it will be desirable to bypass the filtration zone 19 by closing valves 34, 35, 71 and 76. Valve 41 in line 24 is opened to bypass slurry around the line filter area 19. Rotary filtrate is diverted to recovery by closing valve 68 in line 17 and opening valve 69 in line 70. To begin a solvent backwash operation, valve 72 in line 73 and valve 77 in line 78 are opened. The filter area 19 is washed with solvent at a temperature sufficiently high to melt wax crystals clogging the filter surface. After the temperature in line 78 reaches about 150° F., valve 72 in line 73 is closed and valve 74 in line 75 is opened. When the temperature in line 78 reaches approximately the desired filtering temperature, valve 74 in line 75 and valve 77 in line 78 are closed. To restore slurry flow through the filter area 19, valves 34 and/or 35, 76 are opened, and 41 is closed. Filtration resumes when valve 71 in line 21 and valve 68 in line 17 are opened and valve 69 in line 70 is closed.

Provision is made for introducing fresh solvent into line 24 by way of line 49 controlled by valve 50.

As an example of an operation in accordance with Fig. 1, about 6,000 barrels per day of lubricating oil distillate may be charged to line 11, about 7,000 barrels per day of primary solvent may be introduced by line 12; the secondary stage filtrate and secondary solvent may total about 9,000 barrels per day while the fresh solvent introduced by line 49 may approximate about 7,000 barrels per day. The rotary filter wash introduced by line 47 by opening valve 46 may be about 6,000 barrels per day. The dewaxed oil recovered in line 21 may comprise 13,000 barrels per day of solvent and 4,200 barrels per day of oil while the wax and solvent recovered by line 28 may comprise 7,000 barrels per day of solvent and 1,800 barrels per day of wax.

An operation in accordance with Fig. 1 allows the obtaining of markedly improved results in capital investment and increased throughput.

In order to illustrate the invention further, a number of runs were made in which a chilled solution of a neutral lubricating oil distillate and methyl ethyl ketone in aromatic solvent was flowed through a line filter at a constant filtration rate. The operation of the line filter with respect to filter rate was compared with the operation of a rotary filter with respect to filter rate. The data for these several runs are presented in Table I.

From these data it may be seen that the line filter allows substantially improved filter rates over the rotary filter and that by employing a line filter in conjunction with a rotary filter which removes the remainder of the oil from the wax, substantially improved results may be obtained.

Figure 2:
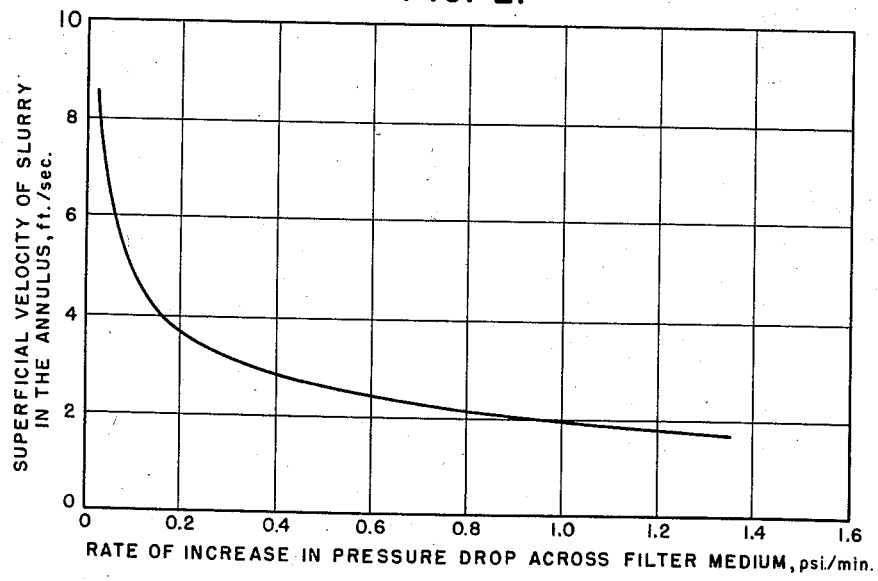
Fig. 2 is a plot of data showing the relationship between the annulus velocity and the pressure drop for one feed stock.
Figure 3:
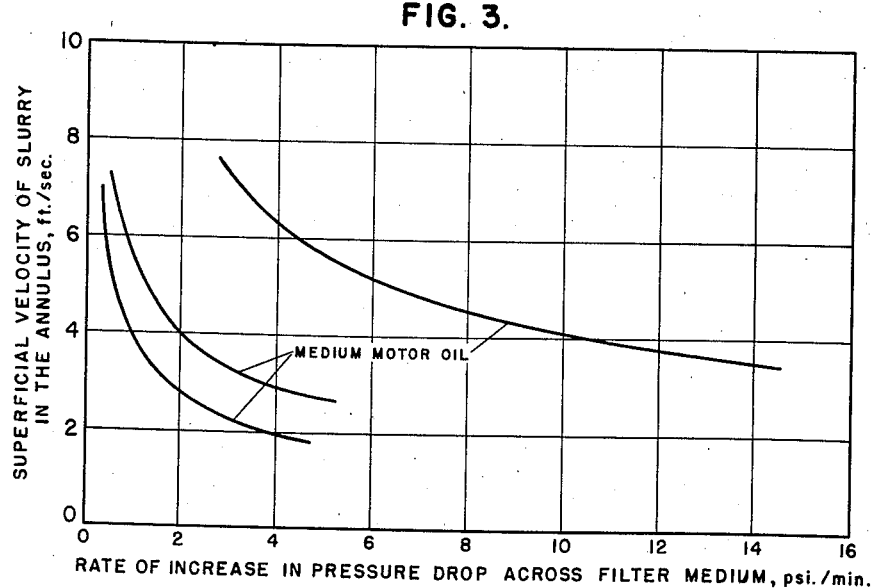
Fig. 3 is a plot of data showing the relationship between the annulus velocity and the pressure drop for another stock.

The data from several of the runs are then plotted and shown in Fig. 2. Referring to Fig. 2, it will be seen that a critical superficial annulus velocity is reached at about 5 feet per second with an improvement being obtained up to that point but further substantial improvement beyond that point not being obtained. In Fig. 3, a plot of data is presented on runs where a medium motor oil was being charged. Similar beneficial results were also obtained as shown by the plot.

Figure 4:
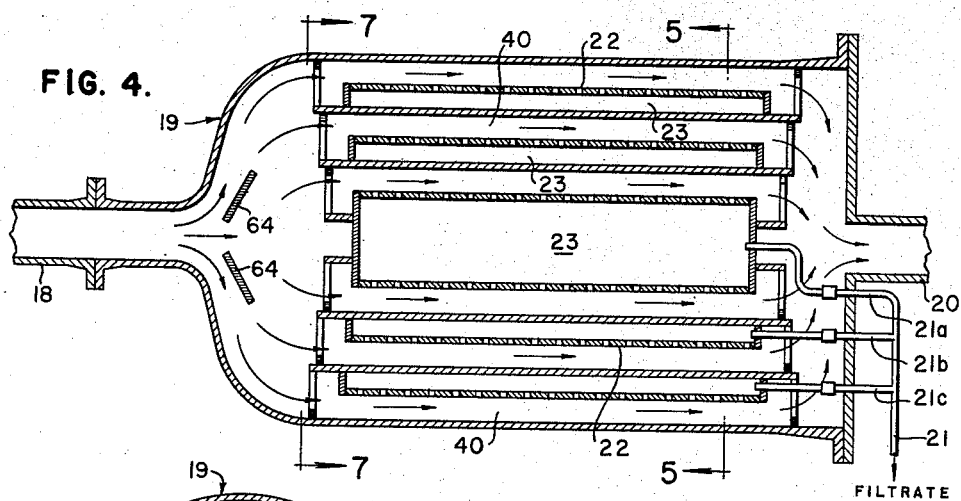
Fig. 4 is a sectional view of a suitable line filter.
Figure 5:
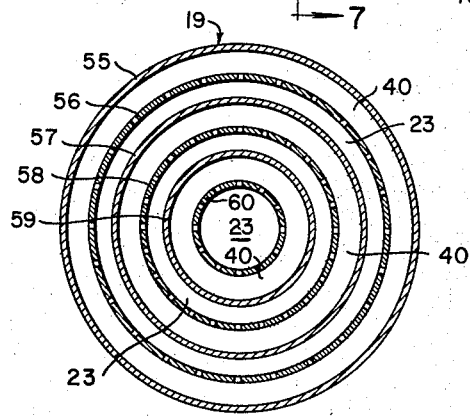
Fig. 5 is a view taken along the lines 5—5 of Fig. 4.
Figure 6:
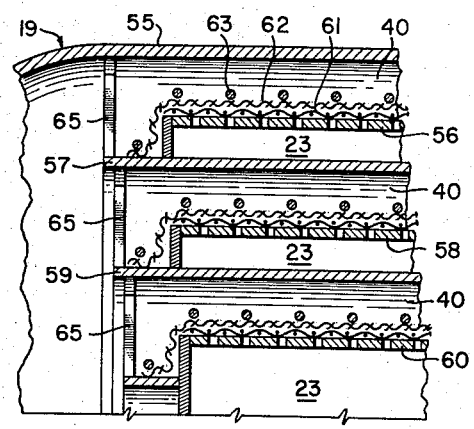
Fig. 6 is a detailed sectional partial view of Fig. 4.
Figure 7:
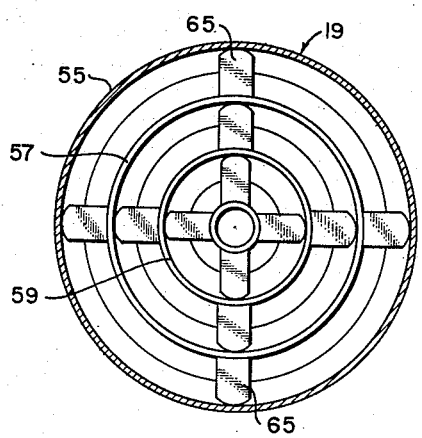
Fig. 7 is a view taken along the lines 7—7 of Fig. 4.

Referring now to Figs. 4 to 6, a line filter 19 is shown which may be constructed as a concentric multi-element unit consisting of several pipes, such as 55, 56, 57, 58, 59, and 60 of diminishing size placed concentrically to form annuli within the larger pipe 55. Alternate annuli may be closed to handle the filtrate. Slurry flows through the open annuli, such as 40, with the outer of two pipes forming a closed annulus, such as 23, with the outer of the two pipes being perforated and covered with a wire mesh, such as 61, fitted with a cylindrical sock of nylon cloth 62 open at both ends. For reasons of clarity, the filter cloth and wire mesh are not shown in Figs. 4, 5, and 7, but are shown in detail in Fig. 6. Each of the ends of the sock 62 are secured with wire 63 which spirals the length of the filtering element comprised of the perforated pipe, such as 56, 58, and 60. Filtrate is withdrawn through the conduits 21a, 21b and 21c into conduit or pipe 21.

A suitable line filter may be housed in a 16-inch pipe about 15 feet long and containing a total of about 230 square feet of area which is equivalent to about 500

Table 1

| Run No. | Filter Surface Area (ft.²) | Annulus Area (ft.²) | Filter Temp. (° F.) | Filtrate ||||||  |
|---|---|---|---|---|---|---|---|---|---|
| | | | | Density at Filt. Temp., lb./ft.³ | Viscosity at Filt. Temp. ($\frac{lb.}{ft./sec.} \times 10^3$) | Volume Percent oil | Dewaxed oil pour (° F.) | Rate (lb./hr./ft.²) | Corrected Rate [1] (lb./hr./ft.²) |
| 40 | 1.23 | 0.0413 | −2 | 53.94 | 0.877 | 17.6 | 10 | 199.8 | 201 |
| 42 | 1.23 | 0.0413 | 0 | 53.83 | 0.840 | 15.8 | 10 | 196.7 | 193 |
| 45 | 1.23 | 0.0413 | −4 | 53.86 | 0.812 | 13.0 | 5 | 196.7 | 189 |
| 46 | 1.23 | 0.0413 | −9 | 53.96 | 0.819 | 13.5 | 5 | 201.8 | 196 |
| 47 | 1.23 | 0.0413 | −2 | 53.88 | 0.800 | 18.8 | 5 | 349.3 | 335 |
| 48 | 1.23 | 0.0413 | −2 | 53.71 | 0.821 | 14.2 | 5 | 233.0 | 227 |
| 50 | 1.23 | 0.0413 | −4 | 53.73 | 0.775 | 13.6 | 5 | 329.3 | 311 |
| 51 | 1.23 | 0.0413 | −4 | 53.83 | 0.742 | 12.2 | 10 | 280.5 | 259 |
| 52 | 1.23 | 0.0413 | −4 | 53.86 | 0.748 | 21.0 | 10 | 331.1 | 307 |
| 53 | 1.23 | 0.0413 | −4 | 53 77 | 0.764 | 7.5 | ---- | 228.6 | 215 |
| 54 | 1.23 | 0.0413 | −2 | 53.68 | 0.728 | 12.0 | 10 | 280.9 | 257 |

| Run No. | Slurry |||| ΔP Pressure Drop Increase (p.s.i.) | T Run Length (min.) | ΔP/T | Effective Rotary Filter Rate (#/hr./ft.²) | Ratio of Line Filter to Rotary Filter Rate |
|---|---|---|---|---|---|---|---|---|---|
| | Flow (g.p.m.) | Superficial Velocity in Annulus (ft./sec.) | Passed Through Strainer? | Velocity through Screen (ft./sec.) | | | | | |
| 40 | 61.7 | 3.33 | No | | 17.0 | 75 | 0.23 | 93.8 | 2.1 |
| 42 | 51.3 | 2.77 | No | | 21.0 | 35 | 0.60 | 93.8 | 2.0 |
| 45 | 31.8 | 1.72 | No | | 22.8 | 35 | 0.65 | 81.6 | 2.3 |
| 46 | 92.1 | 4.97 | No | | 6.6 | 120 | 0.055 | 81.6 | 2.4 |
| 47 | 92.1 | 4.97 | No | | 11.5 | 8 | 1.437 | 118.0 | 2.8 |
| 48 | 91.9 | 4.96 | No | | 10.0 | 120 | 0.083 | 118.0 | 2.0 |
| 50 | 63.4 | 3.42 | No | | 15.4 | 36 | 0.428 | 118.0 | 2.8 |
| 51 | 65.0 | 3.51 | No | | 11.7 | 75 | 0.153 | 118.0 | 2.2 |
| 52 | 36.7 | 1.98 | No | | 22.8 | 17.5 | 1.303 | 118.0 | 2.6 |
| 53 | 36.8 | 1.98 | No | | 22.7 | 18.5 | 1.227 | 118.0 | 1.8 |
| 54 | 150.0 | 8.09 | No | | 5.5 | 125 | 0.044 | 108.2 | 2.2 |

[1] Rates corrected to 1.5 centistokes rising rate inversely proportional to square root of filtrate viscosity.

square feet of rotary filter. The cost of a line filter is about one-half the cost of that of a rotary filter. The line filter is also advantageous in that in the absence of moving parts, maintenance is reduced to a minimum.

Referring to the line filter 19 in Fig. 4, the line filter may suitably be provided with baffle plates 64 for distribution of the chilled slurry through the annuli 40. The line filter 19 is also provided with spacing and supporting lugs 65 to concentrically arrange the several pipes within the larger pipe 55, shown in more detail in Fig. 7.

While the present invention has been illustrated by the several examples and the mode of operation, it is intended that these examples and illustrations are not to be construed by way of limitation.

The nature and objects of the present invention having been completely described and illustrated, what we wish to claim as new and useful and to secure by Letters Patent is:

1. In the dewaxing of a lubricating oil fraction in which a precipitating-diluent solvent is employed, the method which includes the steps of flowing a chilled solution of said lubricating oil and said solvent having a concentration of wax crystals in the range from about 5 percent to about 10 percent by weight through an annular space across a filtering surface in a line filtration zone at a velocity in the range from about 5 to about 15 feet per second to form a concentrated slurry containing wax crystals in an amount in the range from about 20 percent to about 60 percent by weight in said solution and to separate a dewaxed oil phase as a first filtrate, removing the concentrated slurry from said line filtration zone and filtering it in a rotary filtration zone to form a wax phase and a second filtrate, whereby improved filter rates and increased through-puts are obtained.

2. In the dewaxing of a lubricating oil fraction at a low temperature in which a precipitating-diluent solvent is employed, the method which includes the steps of chilling a wet solution of said lubricating oil and said solvent containing over about 1 percent by volume of water to a temperature sufficiently low to form a slurry of wax crystals in said solution having a concentration of wax crystals in the range from about 5 percent to about 10 percent by weight, screening said slurry to remove ice crystals therefrom, flowing said screened chilled solution of said lubricating oil in said solvent through an annular space across a filtering surface in a line filtration zone at a velocity in the range from about 5 to about 15 feet per second to form a concentrated slurry containing wax crystals in an amount in the range from about 20 percent to about 60 percent by weight in said solution and to separate a dewaxed oil phase as a first filtrate, removing the concentrated slurry from said line filtration zone and filtering it in a rotary filtration zone to form a wax phase and a second filtrate whereby improved filter rates and increased throughputs are obtained.

3. In the dewaxing of a lubricating oil fraction at a constant filter rate at a selected filter cycle length in which a precipitating-diluent solvent is employed, the method which includes the steps of flowing a chilled solution of said lubricating oil and said solvent having a concentration of wax crystals in the range from about 5 percent to about 10 percent by weight through an annular space across a filtering surface in a line filtration zone at a velocity in the range from about 5 to about 15 feet per second to form a concentrated slurry containing wax crystals in an amount in the range from about 20 percent to about 60 percent by weight of said solution and to separate a dewaxed oil phase as a first filtrate, removing the concentrated slurry from said line filtration zone and filtering it in a rotary filtration zone to form a wax phase and a second filtrate, interrupting the flow of said chilled solution to the line filtration zone when the pressure drop across the filtering surface exceeds a predetermined figure, washing the filtering surface with said solvent at a temperature sufficiently high to melt wax crystals clogging said filtering surface, and resuming the flow of said chilled solution across said filtering surface at the stated velocity whereby increased through-puts are obtained.

4. A method in accordance with claim 1 in which the second filtrate is admixed with the lubricating oil fraction.

References Cited in the file of this patent

UNITED STATES PATENTS

| | | |
|---|---|---|
| 1,505,453 | Weir | Aug. 19, 1924 |
| 2,268,788 | Wanner et al. | Jan. 6, 1942 |
| 2,595,468 | Kiersted et al. | May 6, 1952 |
| 2,654,692 | Kiersted et al. | Oct. 6, 1953 |
| 2,723,941 | Weeks et al. | Nov. 15, 1955 |
| 2,730,242 | Samuel | Jan. 10, 1956 |
| 2,820,070 | Bennett et al. | Jan. 14, 1958 |